Dec. 14, 1954  H. P. SMITH, JR., ET AL  2,696,987
CHUCK
Filed June 24, 1950
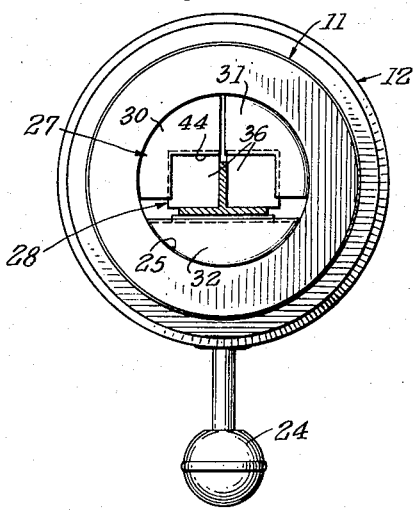
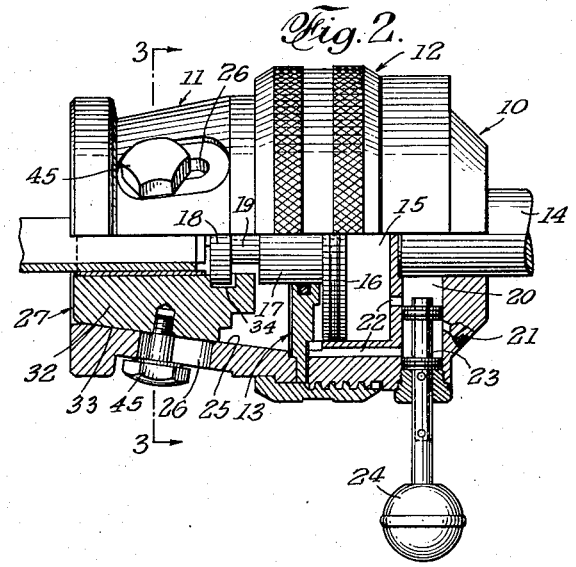
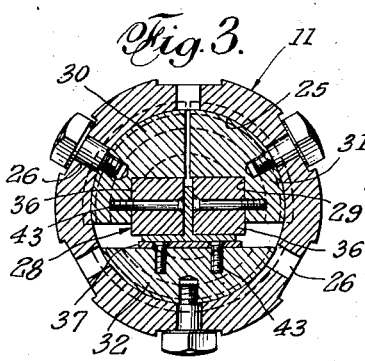
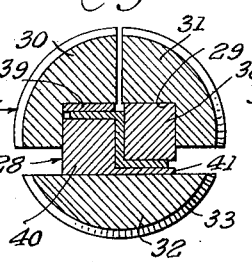
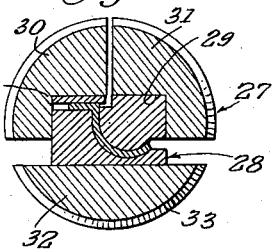
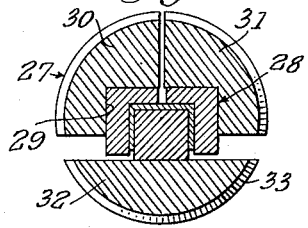
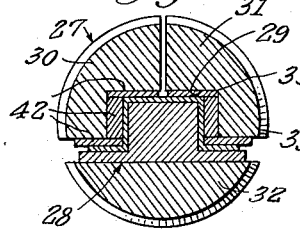
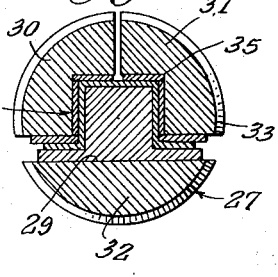
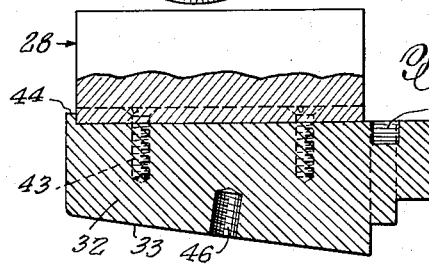
Inventors
HARRY P. SMITH, JR.
CLIFFORD W. HORTON
By C. G. Stratton
Attorney

United States Patent Office 2,696,987
Patented Dec. 14, 1954

2,696,987

CHUCK

Harry P. Smith, Jr., Los Angeles, and Clifford W. Horton, Redondo Beach, Calif., assignors to Hufford Machine Works, Inc., Redondo Beach, Calif., a corporation of California Application June 24, 1950, Serial No. 170,194

4 Claims. (Cl. 279—60)

This invention relates to a chuck for stretch-forming and like machines.

Stretch-forming machines use two opposed chucks between which extends an elongated member, and a bend of desired form is made in said member by moving one or both chucks relative to a die over which the member is bent, the chucks being so moved that the member is also stretched during bending. The elongated members that are stretch-formed vary considerably in their cross-sectional form. Accordingly, the jaw inserts employed in the chuck to grip the ends of the member are required to be custom built according to the specific cross-sectional shape of the member. Since the inserts must grip with sufficient power to prevent accidental release, the same are at present made of steel, heat-treated and hard-chrome plated, and, because they are made especially for each specific job, are expensive and difficult to make.

An object of the present invention is to provide a chuck of the character indicated in which the jaw inserts are made to a standard form at commensurately lower cost than special forms and to fit said inserts with hardened gripping elements having operating faces that conform to the cross-section of the member gripped thereby. Thus, the gripping elements only need be especially or custom made, and, the same being relatively smaller than the inserts, are hardened and plated with easier facility than were the prior inserts.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is an end view of a chuck fitted with work-gripping inserts according to the present invention, the latter being shown as formed to grip a piece of work having a T-section.

Fig. 2 is a side elevational view thereof in quarter section.

Fig. 3 is a cross-sectional view as taken on line 3—3 of Fig. 2.

Figs. 4 to 7, inclusive, are cross-sectional views showing the inserts of Figs. 1 to 3 provided with work-gripping elements designed to grip various other forms of work pieces.

Fig. 8 is a similar view showing a modification in which the inserts are differently proportioned.

Fig. 9 is a longitudinal section of one of the inserts drawn to an enlarged scale.

The chuck that is illustrated comprises a generally circular body that is composed of a cylinder 10 at the rear, a tapered housing 11 at the front, a ring 12 connecting the cylinder and housing, and a transverse plate 13 between the adjacent ends of said cylinder and housing. The chuck is mounted on a bar 14 and is moved to retracted or projected position thereby.

The cylinder 10 is provided with a cylinder bore 15 in which is fitted a piston 16 having an extension 17 extending through a central bore in plate 13. The latter has a head 18 formed by an annular groove 19. A radial bore 20 is formed in the cylinder, the same being supplied with air or other fluid, under pressure, through a passage 21. Passages 22 supply pressure fluid from bore 20 to the cylinder bore 15, one on each side of piston 13. A piston valve 23, fitted in bore 20, is movable by a handle 24 to control fluid flow from passage 21 through bore 20, and passages 22 to one side or the other of piston 13 to cause projection or retraction of said piston, as desired. Accordingly, head 18 moves longitudinally in the interior of housing 11.

Housing 11 has an internal conically tapered face 25, the small end thereof being at the forward end of the housing. A series of preferably six slots 26 is uniformly arranged in the wall of the housing substantially as shown.

The foregoing chuck body is generally conventional and serves as a means for mounting and actuating the jaw inserts of the present invention.

According to the present invention, a set of jaw inserts 27 is provided and the same is fitted with a cooperating set of work-gripping elements 28.

As hereinbefore mentioned, the cross-sectional form of the work-pieces to be gripped by the chuck may vary considerably. However, the great majority of these work-pieces have overall cross-sectional dimensions that define a certain maximum area. The set of inserts 27, accordingly, is provided with a seat 29 of such size that the set of elements 28 fitted therein will handle work-pieces of such maximum sectional area.

The set of inserts may vary in number. In this case, three inserts 30, 31 and 32, comprise the set. Together, they have an outer conical face 33 that engages face 25 of housing 11. Each insert at the rear thereof, is provided with a seat 34 in which head 18 is engaged, and it will be evident that longitudinal movement of said head will effect projection or retraction, as the case may be, of said set of inserts.

Assuming a set of inserts that has a small diameter of six inches, the seat 29 provided therein will preferably have an area of some ten to twelve or thirteen square inches to insure that the corners 35 of seat 29 are suitably spaced from face 33 so as not to unduly weaken any of the inserts. Accordingly, seat 29 may be two and one-half by four inches, as suggested in Figs. 3 to 7, three and one-half by three inches, as shown in Fig. 8, or three and one-half inches square. Thus, at most, two or three sets of inserts, having seats as exemplified above, will serve to accommodate practically all forms of work-pieces within the range of size of the chuck.

The standard set or sets of inserts thus provided can be easily fitted with a set of work-gripping elements 28 that are of required hardness, and since said elements are relatively smaller than the inserts, they are more readily produced for a special job.

As shown in Fig. 3, simple elongated hardened blocks 36, fitted to inserts 30 and 31, and a flat hardened strip 37, fitted to insert 32, will cooperate to grip a member having a T-section. Any modification of this basic section can be provided for in blocks 36 and/or strip 37. As shown in Fig. 4, employing the same set of inserts 27 having the same seat 29 therein, a simple block 38 fitted to insert 31, a strip 39 fitted to insert 30, and a block 40 formed with a flange 41 and fitted to insert 32, will cooperate to grip a member having a Z-section. Other members having various sections, such as the C-section of Fig. 5 and the U-section of Fig. 6, may be as readily provided.

The gripping elements 36 to 40 are shown as integral parts. As shown in Figs. 7 and 8, they may be fabricated of two or more pieces 42 of rectangular cross-section for further facility of production.

It will be noted that the inserts 30, 31 and 32, in addition to the conical surface thereof, are each defined by longitudinal faces that are substantially at right angles to each other, the same defining lines of cleavage between the inserts that are outside of and parallel to the faces of seat 29 and to the axis of the housing 11. Said lines or planes of cleavage are spaced in practice, to insure gripping by the hardened blocks and/or strips.

Means, such as screws 43, may serve to secure the specially formed sets of elements 28 to the set of inserts 27 and to reduce the shear of such screws, the forward ends of said inserts are preferably provided with abutments 44 for elements 28, as clearly shown in Figs. 1 and 9.

From the foregoing, it will be seen that a standard or basic set of inserts that are easily produced in quantity, can readily be fitted with specially formed gripping elements at lower cost than if a set of inserts were specially formed for each particular job of work.

In the usual manner, bolts 45 are employed to retain the inserts in circumferential spaced relationship in all positions thereof and, when projected to grip a work-piece, to maintain the various surfaces of the seat 29 in parallel relationship one with the other, one such bolt being provided for each insert and extending through guide slots 26 into threaded seats 46 provided in said inserts.

While the invention that has been illustrated and described is now regarded as the preferred embodiments, the constructions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. In a chuck for use in a stretch-forming or like machine, a work-piece gripping structure comprising, in combination: a housing having a conically tapered inner face converging toward an open end of said housing; a plurality of jaw inserts disposed in said housing, said inserts having outer conical faces complementary to and adapted for cooperation with said inner face whereby said inserts will be moved radially inwardly upon movement thereof axially outwardly from said housing, said inserts being circumferentially spaced one from the other to define lines of cleavage that are substantially at right angles to each other; a seat formed in an adjacent pair of said inserts, said seat having walls disposed in parallel relationship to the axis of said housing and to the surfaces of said lines of cleavage; a plurality of hardened gripping elements disposed and engaging the walls of said seat and adapted for cooperation with at least one of said surfaces of said lines of cleavage on another of said inserts, said elements being especially shaped to conform to and to grip a work-piece of angular cross-sectional configuration; and means for retaining said gripping elements in position with respect to said seat.

2. In a chuck for use in a stretch-forming or like machine, a work-piece gripping structure comprising, in combination: a housing having a conically tapered inner face converging toward an open end of said housing; a plurality of jaw inserts disposed in said housing, said inserts having outer conical faces complementary to and adapted for cooperation with said inner face whereby said inserts will be moved radially inwardly upon movement thereof axially outwardly from said housing, said inserts being circumferentially spaced one from the other to define lines of cleavage that are substantially at right angles to each other; a seat formed in an adjacent pair of said inserts, said seat having walls disposed in parallel relationship to the axis of said housing and to the surfaces of said lines of cleavage; a plurality of hardened gripping elements disposed in and engaging the walls of said seat and adapted for cooperation with at least one of said surfaces of said lines of cleavage on another of said elements, said elements being especially shaped to conform to and grip a work-piece of angular cross-sectional configuration; screw means for retaining said gripping elements in contact with said seat; and abutments formed on the outer ends of said inserts and extending into the space defined by at least one of said lines of cleavage for engaging the outer ends of said gripping elements thereby to take axial thrust of said elements under pull of said work-piece in said chuck.

3. In a chuck for use in a stretch-forming or like machine, a work-piece gripping structure comprising, in combination: a substantially cylindrical housing having a conically tapered inner face converging toward an open end of said housing; three jaw inserts disposed in said housing, said inserts having outer conical faces complementary to and adapted for cooperation with said inner face whereby said inserts will move radially inwardly upon movement thereof axially outwardly from said housing, said inserts being circumferentially spaced one from the other to define lines of cleavage that are at right angles to each other; a rectangular seat formed in two adjacent inserts, said seat having walls disposed in parallel relationship to the axis of said housing and to the surfaces of said lines of cleavage; at least two hardened gripping elements disposed in and engaging the walls of said seat and adapted for cooperation with at least one of said surfaces of said lines of cleavage on the other of said inserts, said elements being especially shaped to conform to and grip a work-piece of angular cross-sectional configuration; screws extending through each of said gripping elements and into adjacent inserts for retaining said gripping elements in contact with said seat; and abutments formed on the outer ends of said inserts and extending into the space defined by at least one of said lines of cleavage for engaging the outer ends of said gripping elements thereby to take axial thrust of said elements under pull of said work-piece in said chuck.

4. In a chuck for a stretch-forming or like machine, a housing having a conically tapered inner face converging toward an open end of said housing, a set of jaw inserts in the housing and having an outer conical face operatively engaged with said inner face whereby said inserts will be moved radially inwardly upon movement thereof axially outwardly from said housing, said set of inserts comprising at least two members which together define a longitudinal seat having spaced side portions extending parallel to the axis of said housing and having a standard size and shape whereby said set of inserts is adapted to be produced in quantity, a set of hardened gripping elements in said seat and secured to the inserts, said elements having cooperating faces extending axially parallel to said housing and especially formed to engage and grip a work-piece of irregular cross-sectional form, the seat in the set of inserts being of such relative size to the area of the smaller end of said set of inserts that a minimum distance is provided between said conical face of the set of inserts and that portion of the seat which most nearly approaches said conical face, and an abutment on the outer end of said set of inserts for engaging the ends of the hardened gripping elements to take the axial thrust of said elements under pull of a work-piece in the chuck.

References Cited in the file of this patent

UNITED STATES PATENTS

| Number | Name | Date |
| --- | --- | --- |
| 440,255 | Austin | Nov. 11, 1890 |
| 460,601 | Skinner | Oct. 6, 1891 |
| 926,761 | Oliver | July 6, 1909 |
| 1,037,796 | Procunier | Sept. 3, 1912 |
| 1,118,072 | Thompson | Nov. 24, 1914 |
| 1,129,491 | Housel | Feb. 23, 1915 |
| 1,245,361 | Lutz | Nov. 6, 1917 |
| 1,295,994 | Lavoie | Mar. 4, 1919 |
| 1,335,714 | Lea | Mar. 30, 1920 |
| 1,403,415 | Iggberg | Jan. 10, 1922 |
| 1,540,832 | Forster | June 9, 1925 |
| 1,665,250 | Atkins | Apr. 10, 1928 |
| 1,857,012 | Corley | May 3, 1932 |